No. 731,123. PATENTED JUNE 16, 1903.
O. L. OWEN.
JOURNAL BEARING FOR THE WARP BEAMS OF LOOMS.
APPLICATION FILED NOV. 14, 1901.
NO MODEL.
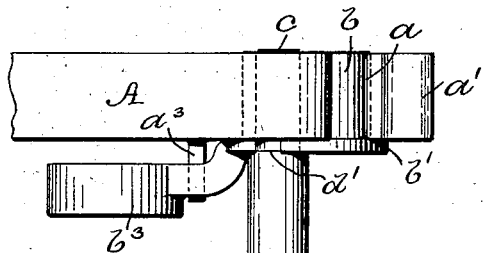
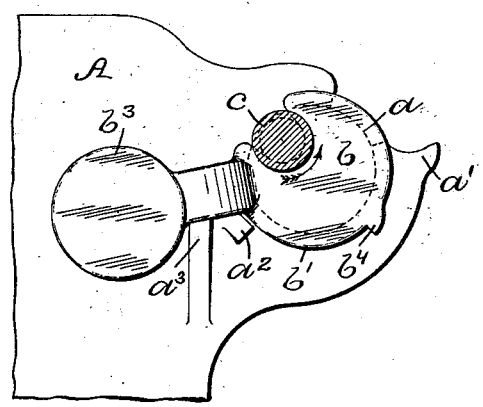
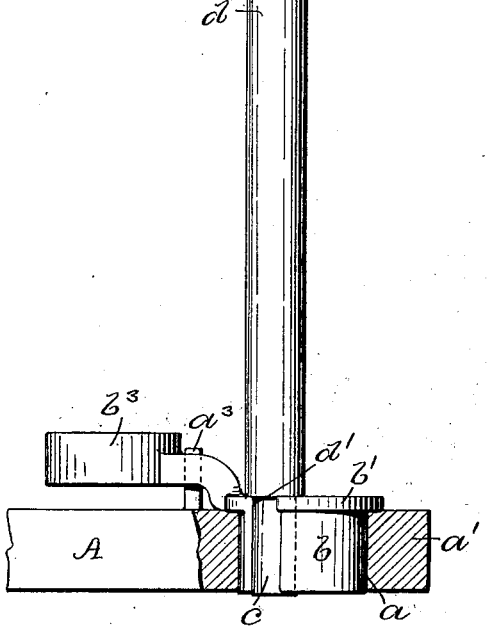
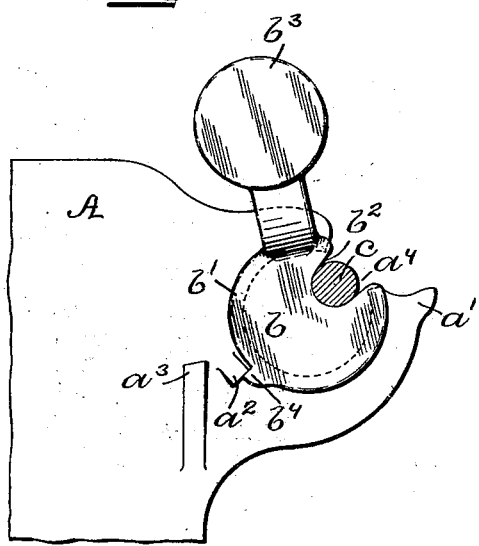
WITNESSES:
Chas. H. Luther Jr.
Ada E. Hagerty
INVENTOR:
Oscar L. Owen
by Joseph H. Miller & Co.
ATTORNEYS.

No. 731,123. Patented June 16, 1903.

UNITED STATES PATENT OFFICE.

OSCAR L. OWEN, OF WHITINSVILLE, MASSACHUSETTS, ASSIGNOR TO THE WHITIN MACHINE WORKS, INCORPORATED, OF WHITINSVILLE, MASSACHUSETTS.

JOURNAL-BEARING FOR THE WARP-BEAMS OF LOOMS.

SPECIFICATION forming part of Letters Patent No. 731,123, dated June 16, 1903.

Application filed November 14, 1901. Serial No. 82,239. (No model.)

*To all whom it may concern:*

Be it known that I, OSCAR L. OWEN, a citizen of the United States, residing at Whitinsville, in the county of Worcester and State of Massachusetts, have invented a new and useful Improvement in Journal-Bearings for the Warp-Beams of Looms, of which the following is a specification.

The journals of warp-beams require to be securely held in their bearings to prevent the vibration of the warp-beams. The journal-bearings for the warp-beam require to be open on the rear to permit of the placing of the warp-beam on the journal-bearing. To secure these ends, I have designed a journal-bearing consisting of two cylindrical blocks supported in cylindrical bearings in the end frames. The blocks have the journal-bearing for the warp-beam journal on one side of the blocks. The blocks are provided with weighted levers by which they may be turned, and stops are provided on the end frames to arrest the rotation of the blocks at the desired points.

Figure 1 is a top view, partly in section, illustrating the support of the beam-shaft in the rotatable blocks. Fig. 2 is a side view of part of an end frame of a loom, showing the beam-shaft in section journaled in the rotatable bearing-block when in the locked position. Fig. 3 is a side view of one of the end frames, showing the beam-journal in the unlocked position.

In the drawings, A A indicate the end frames; $a\,a$, openings in the end frames forming the supports of the cylindrical journal-blocks $b\,b$; $a'\,a'$, the temporary supports of the journals of the warp-beam; $a^2$, a stop on the end frame, and $a^3$ another stop on the frame. The blocks $b\,b$ are of cylindrical form to fit the openings $a\,a$ in the end frames with a sliding fit and have on one end the flanges $b'\,b'$. They are provided at one side with the slot $b^2$, in which the journal $c$ is supported within the cylindrical surface of the openings $a\,a$. The blocks $b\,b$ have each the weighted lever $b^3$ and the shoulder $b^4$ extending from the flange $b'$. The blocks $b\,b$ are preferably of more than twice the diameter of the journal $c$. The shaft $d$ supports the warp-beam. The journals $c\,c$ are preferably turned down, so as to form the shoulder $d'$, which bears against the flanged ends of the blocks $b\,b$.

When a warp-beam is to be placed on the loom, the blocks are turned in the openings $a\,a$ until the shoulder $b^4$ is in contact with the stop $a^2$. The slot $b^2$, forming the bearing for the journal $c$, is now opposite the opening $a^4$ in the end frame. The warp-beam is now rolled inward until the journals rest in the bearing $b^2$ in the blocks $b\,b$. The two bearing-blocks are now simultaneously turned into the position shown in Fig. 1, when the journal-bearing is locked between the bearing in the block and the bearing of the block in the end frame, the strain on the warp-beam being resisted by the end frame.

Having thus described my invention, I claim as new and desire to secure by Letters Patent—

1. In a loom, the combination with the end frames and stops thereon, of cylindrical blocks supported in cylindrical bearings in the end frames, stops formed on the blocks, means for rotating the blocks, and open journal-bearings for the warp-beam formed in the outer peripheral surfaces of the blocks, whereby when the blocks are rotated in one direction the warp-beam will be moved inward and locked in position and when rotated in the opposite direction the warp-beam will be moved outward to facilitate its removal from the bearings, as described.

2. In a loom, the combination with the end frames, the circular bearings $a\,a$, the stops $a^2\,a^3$, and the opening $a^4$ in the end frames, of the rotatable blocks $b\,b$, the flange $b'$ on the blocks, the open journal-bearing in the periphery of the blocks, the shoulder $b^4$, and the weighted lever $b^3$, whereby the journals of the warp-beam may be placed into the journal-bearings and secured against vibration by the partial rotation of the bearing-blocks, as described.

In testimony whereof I have signed my name to this specification in the presence of two subscribing witnesses.

OSCAR L. OWEN.

Witnesses:
ADA E. HAGERTY,
JOSEPH A. MILLER, Jr.